June 25, 1963
A. SHERMAN ETAL
3,094,837
ROCKET MOTOR
Filed Feb. 19, 1957
2 Sheets-Sheet 1
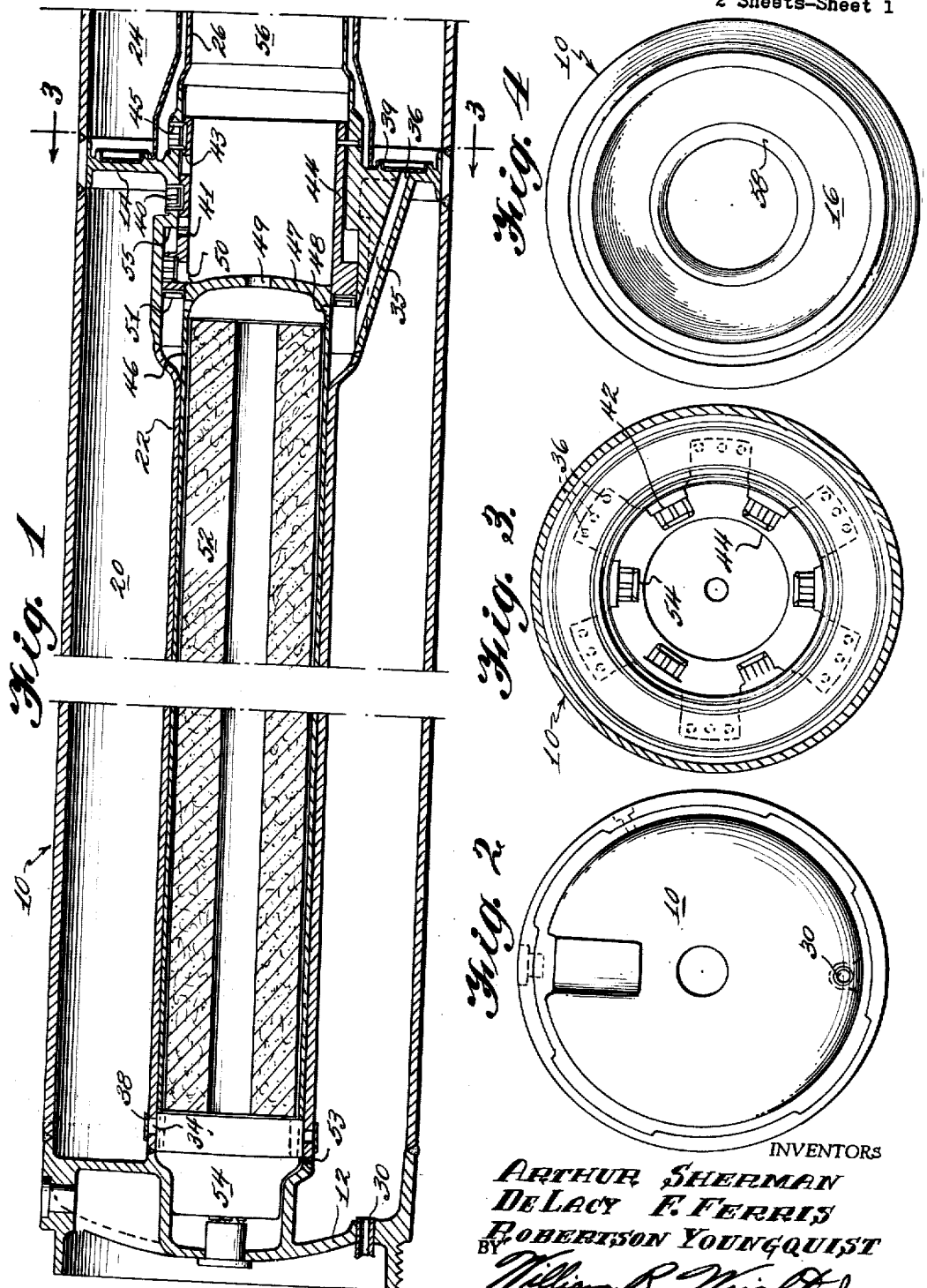
INVENTORS
ARTHUR SHERMAN
DELACY F. FERRIS
ROBERTSON YOUNGQUIST
BY William R. Wright, Jr.
THEIR AGENT June 25, 1963 A. SHERMAN ETAL 3,094,837
ROCKET MOTOR
Filed Feb. 19, 1957
2 Sheets-Sheet 2
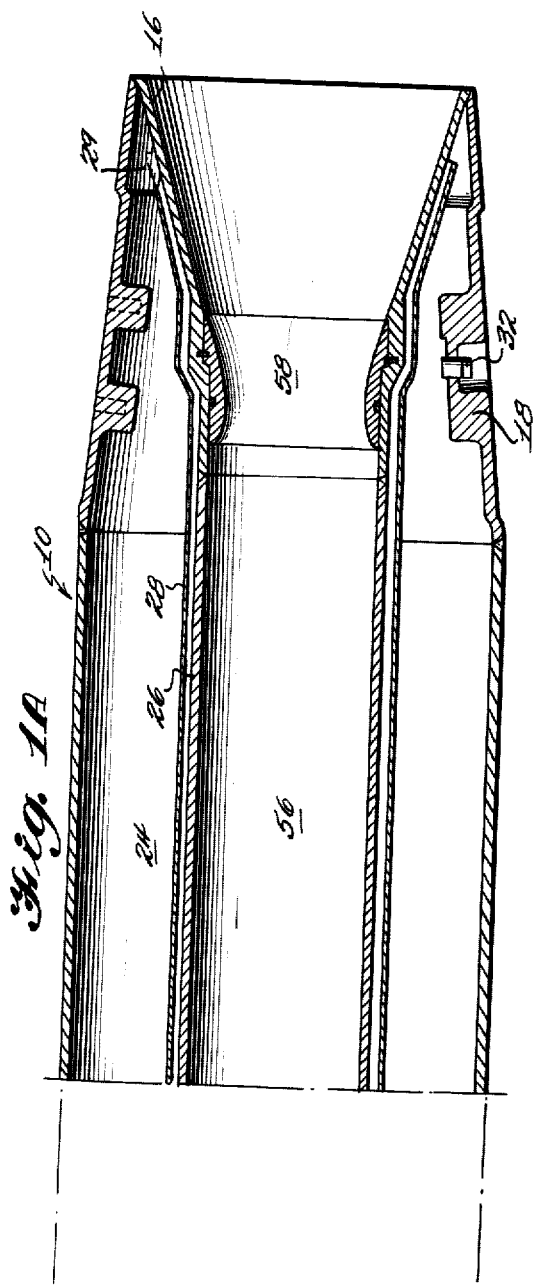
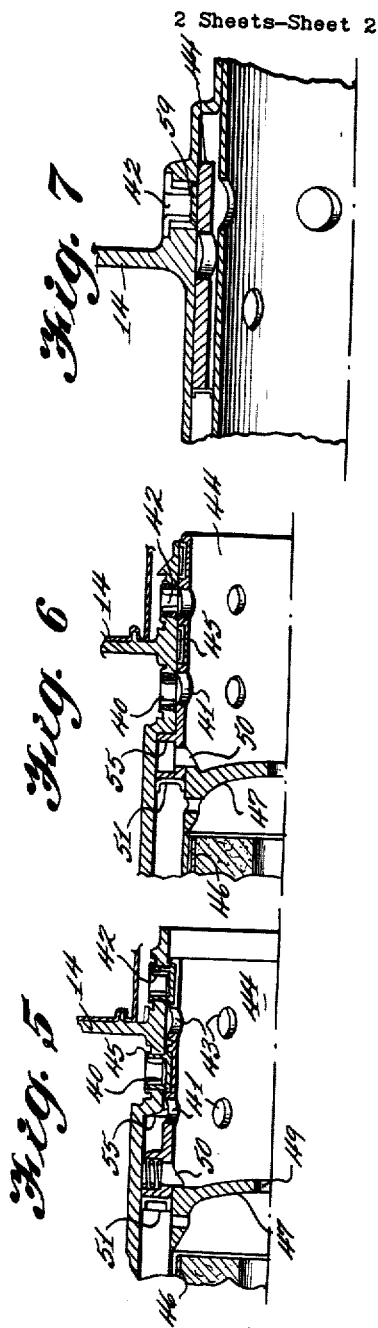
INVENTOR.
ARTHUR SHERMAN
DE LACY F. FERRIS
ROBERTSON YOUNGQUIST
BY
William R. Wright, Jr.
THEIR AGENT United States Patent Office 3,094,837
Patented June 25, 1963

3,094,837
ROCKET MOTOR
Arthur Sherman, West Caldwell, and De Lacy F. Ferris and Robertson Youngquist, Morristown, N.J., assignors, by mesne assignments, to Thiokol Chemical Corporation, a corporation of Delaware
Filed Feb. 19, 1957, Ser. No. 641,436
12 Claims. (Cl. 60—35.6)

This invention relates generally to powerplants and more particularly to rocket type powerplants to which explosive and other type missiles can be readily attached for firing.

Rocket powerplants for missiles are well known in the art but, despite extensive research and experimentation, it has thus far been impossible to achieve a low-cost, mass producible, liquid propellant, rocket powerplant suittable for short duration missile applications. Therefore, the chief object of the present invention is to provide a prepackaged, liquid propellant, rocket powerplant for missiles.

An important object of the present invention is to provide an improved powerplant for missiles which closely integrates propellent tankage, a small solid propellant gas generator and a combustion chamber in a highly-producible, low-cost unit.

Another important object of the present invention is to provide an improved powerplant for missiles wherein liquid propellant rocket tanks are hermetically sealed against fluid pressures arising during storage and handling and are readily opened by means of pressurizing gas, without disturbance to the injection orifices.

A further important object of the present invention is to provide an improved rocket powerplant for missiles wherein rapidly generated gas pressure effects pressurization of the oxidizer and fuel, and the alignment and opening of orifices therefor to effect a jet mixing and ignition thereof with a minimum of ignition delay.

A still further important object of the present invention is to provide an improved rocket powerplant which ensures a rapid buildup of gas generator and propellant tank pressures resulting in a very short ignition delay thus enabling a close control over powerplant starting because of the use of shear cups, the elimination of close tolerance though the use of O-rings, the positive simultaneous opening of all liquid orifices, and of the positive, easily controlled nature of the operation, i.e., shearing of projections, the shearing strength of which can be accurately controlled.

Another important object of the present invention is to provide an improved rocket powerplant wherein a solid propellant pressurizing charge is so located that gas flows therefrom at both ends into the forward ends of both the fuel and oxidizer tanks, thus allowing the solid propellant to be of two different compositions such as oxidizer rich at the forward end and fuel rich at the aft end in order to insure compatibility of the pressurizing gas with the liquid propellant being pressurized.

Other objects and advantages of the invention will become apparent during the course of the following description.

In the drawings we have shown one embodiment of the invention. In this showing:

FIGURES 1 and 1A are a central, longitudinal sectional view of the powerplant comprising the present invention;

FIGURE 2 is an elevatonal view of the forward end thereof;

FIGURE 3 is a transverse, sectional view thereof taken on the line 3—3 of FIGURE 1;

FIGURE 4 is an elevational view of the rear end of the powerplant;

FIGURE 5 is a fragmentary, sectional view of the injection shear cups and the support slide in the static position;

FIGURE 6 is a view similar to FIGURE 5 with the slide in the firing position; and FIGURE 7 is a view similar to FIGURE 5 showing the use of burst discs rather than shear cups.

Referring to the drawings, numeral 10 designates the powerplant comprising the present invention as a whole which comprises an elongated tank preferably of standard, extruded aluminum tubing which is welded to rugged, forged, forward, central, and aft headers 12, 14 and 16 respectively. The aft header and exit cone 16 is designed to accommodate aft missile fins supported at 18 in order to maximize the propellant storage volume within the allowable powerplant space envelope 10.

An oxidizer tank or chamber 20 is defined by the forward and central headers 12 and 14, the outer wall, and an inner annular wall 22 while a fuel tank or chamber 24 is similarly defined between the central and aft headers and an inner annular wall 26 terminating in the exit cone 16. Regenerative cooling of the thrust chamber to be described is enabled by the use of a tubular baffle 28 closely surrounding but spaced from the inner fuel tank wall 26 and extending from the central header 14 rearwardly to the aft header and exit cone 16 where it is corrugated as at 29. When the tank 24 is pressurized, fuel flows through the corrugations and along the passage formed by the walls 26 and 28 to the injection orifices to be described.

Suitable propellants for the powerplant 10 are inhibited red fuming nitric acid (IRFNA) containing approximately 18–23% $NO_2$ and unsymmetrical dimethyl hydrazine (UDMH) as the oxidizer and fuel and these are stored in the tandem tankage 20 and 24 respectively. The tanks 20 and 24 are provided with filler openings 30 and 32 respectively which are hermetically sealed after filling.

The forward end of the inner tank wall 22 has a plurality of circumferentially spaced oxidizer tank pressurizing orifices 34 formed therein while fuel tank pressurizing passages 35 formed in the header 14 terminate in orifices 36 spaced about the central header 14, all the orifices being sealed by burst bands 38 and 39 respectively which are designed to withstand handling loads. The header 14 includes a fixed, centrally arranged annular portion having a row of circumferentially spaced injection orifices 40 and 42 formed therein and communicating respectively with the oxidizer tank 20 and the fuel tank 24.

An annular slide 44 is mounted in the annular portion of the central header and is provided with a double row of circumferentially spaced injection orifices 41 and 43 which are adapted respectively to be aligned with the orifices 40 and 42 when the slide 44 is moved from the position shown in FIGURE 5 to that shown in FIGURE 6.

During storage and handling, the liquid propellant tanks are sealed by small shear cups 45 welded to the orifices 40 and 42 and supported in partially drilled holes in the slide 44. The injection orifices 40 and 42 are smaller in diameter than the cups 45 so that the shape and size of the orifices will not be affected when the cups are sheared.

A solid propellant gas generator is contained within the annular oxidizer tank 20 and comprises a mild steel tube 46 to the aft end of which is welded a disc or plate 47 having a jet mixing orifice and fuel tank pressurizing orifices 48 connecting with passages 35. The generator is maintained in position in the tank 20 by means of spring loaded detents 50 mounted in the slide 44 and engaging the plate 47. A solid propellant 52 is contained in the gas generator 46 and spaced from the orifices 34 and when ignited, both pressurizes the liquid propellants and aids in their rapid and efficient combustion as will be explained. An ignitor 54 for the solid propellant 52 is retained adjacent its forward end by means of a bayonet pin connector 53.

The gas generator tube 46 is of slightly less diameter than the slide 44 which is sealed against leakage by seal 51 and can be installed in the powerplant 10 from the aft end just prior to takeoff. Without the generator, the powerplant is nonpropulsive and it may be inserted or removed as desired by means of a simple tool to depress the detents 50. The aft loading and the nonpropulsive safety provisions are among the important features of the present invention.

The thrust chamber 56 is located within the annular fuel tank and is largely formed by its inner wall 26 which is regeneratively cooled by the flow of the fuel around the aft end of the baffle 28 to the injector orifices 42, and further protected for short duration applications by the use of a suitable ceramic coating. The propellants are injected radially into the forward end of the thrust chamber 56 where they are thoroughly mixed by the hot, high velocity gases from the solid propellant 52 issuing from the jet mixing orifice 49 in the plate 47. A combustion chamber nozzle 58 is positioned at the head of the exit cone 16.

*Operation*

When the powerplant 10 is to be armed after missile electrical checkouts have been completed, the ignitor assembly 54 is inserted and locked into the forward end of the gas generator 46 which is then inserted into the aft end of the powerplant past the spring loaded detents 50 in the forward end of the slide 44 which snap into place to retain the generator in its position. The powerplant is now armed.

The powerplant 10 is fired by igniting the generator 46 and the hot gas pressure resulting from combustion therein causes it to apply a force against the slide 44 and the detents 50. The gas generator and slide move against a shoulder 55 in the central header forcing 14 to shear off the injection shear cups 45 as shown in FIGURE 6. The pressure also acts against the pressurizing burst bands 38 and 39 causing them to rupture and thus admit pressurizing gases into the oxidizer tank 20 and the fuel tank 24, respectively. Additional hot gases flow through the jet orifice 49 of the plate 47 into the thrust chamber 56 to ignite and jet mix the liquid propellants.

A "staged start," a technique often used in liquid rockets to obtain smooth starts is thus effected by the sequential ignition of the powerplant 10 wherein the gas generator 46 is first ignited and followed by ignition of the liquid propellant. Moreover, a smooth, clean powerplant shutdown is ensured by permitting the gas generator grain (solid propellant 52) to burn slightly longer than rated powerplant duration. Thus, all residual propellant is purged by the continuing flow of pressurizing gas and any propellants dribbling into the combustion chamber 56 will be ignited by the jet mixing flame issuing from the orifice 49, thereby preventing "popping."

In FIGURE 7, the shear cups 45 sealing the injection orifices 40 and 42 have been eliminated and burst disks 59 substituted therefor. The disks 59 are supported by the slide 44 whose aligned pattern of orifices 41 and 43 are of greater diameter than the disks. When the gas generator is ignited and the slide moves to the right, the support for the disks will be removed as the orifices become aligned and pressure in the propellant tanks 20 and 24 will blow the burst disks 59 into the thrust chamber 56.

It is to be understood that the forms of our invention herewith shown and described are to be taken as preferred examples of the same and that various changes in the shape, size and arrangement of parts may be resorted to without departure from the spirit of the invention or the scope of the subjoined claims.

We claim:
1. A rocket powerplant for missiles comprising a thrust chamber, a liquid propellant tank having a port communicating with said chamber, a cup sealing said port and projecting into said chamber, a pressure chamber communicating with said tank and said thrust chamber, a solid propellant positioned in said pressure chamber to effect pressurization of the propellant in said tank and ignition of the propellant in said thrust chamber upon ignition of said solid propellant, and means operable upon said ignition to shear and retain said cup to admit propellant to said thrust chamber.

2. A device as recited in claim 1 wherein said means comprises a slide including a port adapted to be aligned with said first mentioned port mounted in said thrust chamber and said pressure chamber upon pressurization is movable to move said slide.

3. A device as recited in claim 1 wherein said thrust chamber and said tank have a common wall arranged for regenerative cooling of said thrust chamber upon passage of propellant from said tank thereto.

4. A device as recited in claim 3 wherein said common wall terminates in an exhaust gas exit cone.

5. A device as recited in claim 3 wherein said tank is coextensive with said exit cone.

6. A device as recited in claim 1 wherein said thrust chamber and said tank are concentric.

7. A rocket powerplant for missiles comprising an elongated tube, the aft half of said tube forming a thrust chamber terminating in a nozzle, a pressure chamber including a single solid propellant mounted in the forward end of said tube and having an orifice communicating with said thrust chamber, a liquid-propellant tank mounted on said tube and including ports communicating with said thrust and pressure chambers, and seals closing said ports to prevent leakage of the liquid propellant, said thrust chamber having a side mounted in its forward end movable by said pressure chamber upon pressurization thereof to rupture the seals closing said ports communicating with said thrust chamber.

8. A rocket powerplant for missiles comprising a thrust chamber, a liquid propellant tank having a port communicating with said chamber, a cup sealing said port and projecting into said chamber, a pressure chamber communicating with said tank and said thrust chamber, a solid propellant positioned in said pressure chamber to effect pressurization of the propellant in said tank and ignition of the propellant in said thrust chamber upon ignition of said solid propellant, and means operable upon said ignition to shear and retain said cup to admit propellant to said thrust chamber, the amount of said solid propellant being so proportioned to the amount of the liquid propellant as to obtain a longer burning time of the former to ensure a purging of the latter from the powerplant to effect a complete shutdown upon the exhausting of the liquid propellant.

9. A rocket powerplant for missiles comprising an annular liquid-propellant tank, the aft portion of the inner wall of said tank forming a thrust chamber and terminating in an exhaust nozzle, means for admitting propellant into said chamber, and a single solid propellant mounted in a chamber formed by the forward portion of said inner wall for igniting the propellant admitted to said chamber and for pressurizing said tank, said solid propellant being of lesser diameter than said thrust chamber and insertable therethrough, the amount of said solid propellant being so proportioned to the amount of the liquid propellant as to obtain a longer burning time of the former to ensure a purging of the latter from the powerplant to effect a complete shutdown upon the exhausting of the liquid propellant.

10. A rocket powerplant for missiles comprising an elongated tube, the aft half of said tube forming a thrust chamber terminating in a nozzle, a pressure chamber including a single solid propellant mounted in the forward end of said tube and having an orifice communicating with said thrust chamber, a liquid-propellant tank mounted on said tube and including ports communicating with said thrust and pressure chambers, and seals closing said ports to prevent leakage of the liquid propellant, said pressure chamber being of lesser diameter than said thrust chamber and insertable into the powerplant therethrough, the amount of said solid propellant being so proportioned to the amount of the liquid propellant as to obtain a longer burning time of the former to ensure a purging of the latter from the powerplant to effect a complete shutdown upon the exhausting of the liquid propellant.

11. A rocket powerplant for missiles comprising an elongated tube, the aft half of said tube forming a thrust chamber terminating in a nozzle, a pressure chamber including a single solid propellant mounted in the forward end of said tube and having an orifice communicating with said thrust chamber, a liquid-propellant tank mounted on said tube and including ports communicating with said thrust and pressure chambers, and seals closing said ports to prevent leakage of the liquid propellant, a tubular baffle being mounted in said tank closely spaced from and substantially coextensive with said thrust chamber to effect regenerative cooling thereof by the liquid propellant during operation of said powerplant, the amount of said solid propellant being so proportioned to the amount of the liquid propellant as to obtain a longer burning time of the former to ensure a purging of the latter from the powerplant to effect a complete shutdown upon the exhausting of the liquid propellant.

12. A rocket power plant for missiles comprising an elongated tube, the aft half of said tube forming a thrust chamber terminating in a nozzle, a pressure chamber including a single solid propellant mounted in the forward end of said tube and having an orifice communicating with said thrust chamber, a liquid propellant tank containing a radial partition longitudinally dividing said tank into separate oxidizer and fuel sections, said liquid propellant tank mounted on said tube and including ports communicating with said thrust and pressure chambers, and seals closing said ports to prevent leakage of the liquid propellant, said pressure chamber being of lesser diameter than said thrust chamber and insertable into the power plant therethrough.

References Cited in the file of this patent
UNITED STATES PATENTS

| | | |
|---|---|---|
| 2,671,312 | Roy | Mar. 9, 1954 |
| 2,841,953 | Teague | July 8, 1958 |
| 2,940,256 | Conyers et al. | June 14, 1960 |
| 2,954,670 | Helus et al. | Oct. 4, 1960 |
| 2,955,649 | Hoffman et al. | Oct. 11, 1960 |
| 2,972,225 | Cumming et al. | Feb. 21, 1961 |
| 2,992,528 | Ozanich et al. | July 18, 1961 |

UNITED STATES PATENT OFFICE
CERTIFICATE OF CORRECTION

Patent No. 3,094,837　　　　　　　　　　　　　　　　June 25, 1963

Arthur Sherman et al.

It is hereby certified that error appears in the above numbered patent requiring correction and that the said Letters Patent should read as corrected below.

Column 3, line 40, for "forcing" read -- forging --; column 4, line 37, for "side" read -- slide --.

Signed and sealed this 31st day of December 1963.

(SEAL)
Attest:
ERNEST W. SWIDER　　　　　　　　　　　　　　　EDWIN L. REYNOLDS

Attesting Officer　　　　　　　　　　　　Acting Commissioner of Patents